US012687496B2

(12) United States Patent
Heffels et al.

(10) Patent No.: US 12,687,496 B2
(45) Date of Patent: Jul. 21, 2026

(54) MEASURING INSTRUMENT FOR DETERMINING THE GROSS OR NET CALORIFIC VALUE OF A HYDROCARBON-CONTAINING FUEL GAS

(71) Applicant: Siemens Aktiengesellschaft, Munich (DE)

(72) Inventors: Camiel Heffels, Stutensee-Büchig (DE); Konstantin Harr, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 951 days.

(21) Appl. No.: 17/459,863

(22) Filed: Aug. 27, 2021

(65) Prior Publication Data

US 2022/0065790 A1      Mar. 3, 2022

(30) Foreign Application Priority Data

Aug. 28, 2020    (EP) ..................................... 20193394

(51) Int. Cl.
*G01N 21/65* (2006.01)
*F23N 5/00* (2006.01)

(52) U.S. Cl.
CPC ............. *G01N 21/65* (2013.01); *F23N 5/003* (2013.01); *F23N 2221/10* (2020.01)

(58) Field of Classification Search
CPC ...... G01N 21/65; G01N 33/225; G01N 25/22; F23N 5/003; F23N 2221/10
See application file for complete search history.

(56) References Cited

U.S. PATENT DOCUMENTS

| | | | | |
|---|---|---|---|---|
| 3,371,574 | A | * | 3/1968 | Dwyer ...................... G01J 3/44 356/70 |
| 4,783,168 | A | * | 11/1988 | Florisson ............... G01N 21/65 356/301 |
| 4,953,976 | A | | 9/1990 | Adler-Golden et al. |
| 7,385,692 | B1 | * | 6/2008 | Nguyen ................... G01J 3/28 356/301 |

(Continued)

FOREIGN PATENT DOCUMENTS

| | | |
|---|---|---|
| CN | 1226966 A | 8/1999 |
| CN | 103776800 A | 5/2014 |

(Continued)

OTHER PUBLICATIONS

Buric, M.P., 2011. Gas phase Raman spectroscopy using hollow waveguides (Doctoral dissertation, University of Pittsburgh). (Year: 2011).*

(Continued)

*Primary Examiner* — Michelle M Iacoletti
*Assistant Examiner* — Mohamed Doumbia
(74) *Attorney, Agent, or Firm* — Henry M. Feiereisen LLC

(57)                ABSTRACT

The gross or net calorific value of a hydrocarbon-containing fuel gas is determined by using a Raman photometer. A Raman radiation obtained following interaction of laser light with the fuel gas is limited by a bandpass filter to a wavenumber range of the C—H stretching vibrations of the hydrocarbons contained in the fuel gas around 2900 cm$^{-1}$ and is supplied to a photomultiplier and integratively detected by the photomultiplier. The gross or net calorific value is determined from the output signal of the photomultiplier.

17 Claims, 4 Drawing Sheets

(56) References Cited

U.S. PATENT DOCUMENTS

| | | | |
|---|---|---|---|
| 7,973,926 | B1 | 7/2011 | Uibel et al. |
| 2002/0040590 | A1 | 4/2002 | Schley |
| 2002/0127725 | A1 | 9/2002 | Willson |
| 2006/0092423 | A1* | 5/2006 | Servaites ............. G01N 33/225 |
| | | | 356/437 |
| 2007/0103682 | A1* | 5/2007 | Yoo ....................... G01J 3/0218 |
| | | | 356/318 |
| 2013/0055697 | A1 | 3/2013 | Deguchi et al. |
| 2013/0057856 | A1 | 3/2013 | Deguchi et al. |
| 2014/0119400 | A1 | 5/2014 | Kinkade et al. |
| 2016/0061114 | A1 | 3/2016 | Guethe et al. |
| 2017/0184502 | A1 | 6/2017 | Andrews et al. |
| 2020/0041479 | A1 | 2/2020 | Huber et al. |
| 2021/0364440 | A1* | 11/2021 | Sasahara ............ G01N 21/8507 |

FOREIGN PATENT DOCUMENTS

| | | | | |
|---|---|---|---|---|
| CN | 105386877 | A | 3/2016 | |
| CN | 104897642 | A | 9/2016 | |
| CN | 107462566 | A | 12/2017 | |
| CN | 108444976 | A | 8/2018 | |
| CN | 109596598 | A | 4/2019 | |
| CN | 208736797 | U | 4/2019 | |
| CN | 110431415 | A | 11/2019 | |
| DE | 19921981 | A1 * | 11/2000 | ................ F02C 9/40 |
| DE | 102010050549 | A1 | 5/2012 | |
| EP | 1 174 705 | A1 | 1/2002 | |
| KR | 1848441 | B1 * | 4/2018 | ............. G01N 21/65 |
| WO | WO 0050874 | A1 | 8/2000 | |

OTHER PUBLICATIONS

Abrar, I., Arora, T. and Khandelwal, R., 2023. Bioalcohols as an alternative fuel for transportation: Cradle to grave analysis. Fuel Processing Technology, 242, p. 107646. (Year: 2023).*

Mul (2017, Raman spectroscopy for natural gas process applications: An instrumental and operational survey of theory and practice) (Year: 2017).*

Eichmann (2014, Determination of gas composition in a biogas plant using a Raman-based sensor system. Measurement Science and Technology, 25(7), p. 075503) (Year: 2014).*

The Use of Spontaneous Raman Scattering for Hydrogen Leak Detection, de Groot, 1994.

Ormed Aircast PodaLib dynamische Fußheberorthese, Fußgelenkbandagen—Bandagen und Orthesen.

Gas Phase Raman Spectroscopy Using Hollow Waveguides, Buric, 2010.

A customized stand-alone photometric Raman sensor applicable in explosive atmospheres: a proof-of-concept study Marcel Nachtmann, Shaun Paul Keck, Frank Braun, Hanns Simon Eckhardt, Christoph Mattolat, Norbert Gretz, Stephan Scholl, and Matthias Rädle, 2018.

Kiefer et al: Design and characterization of a Raman-scattering-based sensor system for temporarily resolved gas analysis and its application in a gas turbine power plant J. Kiefer, T. Seeger, S. Steuer, S. Schorsch, M.C. Weikl, A. Leipertz; 2008.

Raman Spectroscopy for Natural Gas Process Applications, an instrumental and operational survey of theory and practise, Christiaan Mul, 2017.

Eichmann, S. C et al: "Determination of gas composition in a biogas plant using a Raman-based sensor system"; Measurement Science and Technology; IOP; Bristol; GB, Bd. 25; Nr. 7; Jun. 16, 2014; pp. 75503; XP020266845.

Florisson et al; "Rapid determination of the Wobbe index of natural gas"; Journal of Physics E. Scientific instruments; IOP Publishing; Bd. 22; Nr. 2; published: 1989; pp. 123-128; XP000036441.

The Use of Spontaneous Raman Scattering for Hydrogen Leak Detection, NASA Contractor Report 195373 Aug. 26, 1994.

Ormed Aircast PodaLib dynamische Fußheberorthese, Fußgelenkbandagen—Bandagen und Orthesen; Aug. 24, 2020.

Marcel Nachtmann, Shaun Paul Keck, Frank Braun, Hanns Simon Eckhardt, Christoph Mattolat, Norbert Gretz, Stephan Scholl, and Matthias Rädle A customized stand-alone photometric Raman sensor applicable in explosive atmospheres: a proof-of-concept study, in: Journal of Sensors and Sensor Sysems 2018.

* cited by examiner

Raman signal (normalized)

Gross calorific value as per certificate   / MJ/m$^{-3}$

MEASURING INSTRUMENT FOR DETERMINING THE GROSS OR NET CALORIFIC VALUE OF A HYDROCARBON-CONTAINING FUEL GAS

CROSS-REFERENCES TO RELATED APPLICATIONS

This application claims the priority of European Patent Application, Serial No. 20193394.2, filed Aug. 28, 2020, pursuant to 35 U.S.C. 119(a)-(d), the disclosure of which is incorporated herein by reference in its entirety as if fully set forth herein.

BACKGROUND OF THE INVENTION

The present invention relates to a method for determining the gross or net calorific value of a hydrocarbon-containing fuel gas, and to a measuring instrument for determining the gross or net calorific value of a hydrocarbon-containing fuel gas.

The following discussion of related art is provided to assist the reader in understanding the advantages of the invention, and is not to be construed as an admission that this related art is prior art to this invention.

The standard DIN EN ISO 6976:2016 specifies methods for the calculation of variables relevant to combustion, such as gross calorific value (=higher heating value), net calorific value (=lower heating value), density, relative density, gross Wobbe index and net Wobbe index of natural gases, natural gas substitutes and other combustible gaseous fuels when the composition of the gas by mole fraction is known.

The composition of natural gas is typically measured with the aid of a gas chromatograph (GC), in which the components of the gas mixture are chromatographically separated and detected one by one. The combustion-relevant variables of interest can then be calculated on the basis of the quantitatively determined components. The whole process lasts several minutes in most cases. Although the accuracy of the determination of the gross calorific value by means of a gas chromatograph is around <0.1%, a faster determination of the gross calorific value may be desirable for dual-use applications and gas turbines, which process does not need to be quite so precise.

Another approach involves infrared or Raman spectroscopy. Raman spectroscopy is based on the inelastic scattering of laser light from a sample. The scattered radiation (Raman radiation) is shifted in frequency relative to the incident light (Raman shift) and is detected by means of a spectrograph with downstream CCD array. The frequency shift between the incident and the scattered light is characteristic of the vibrational and rotational structure of the chemical species of the sample. The spectral resolution and sensitivity of a CCD array is, however, insufficient for determining the composition of fuel gas because a high spectral resolution requires small pixels, which consequently only generate weak signals.

It would therefore be desirable and advantageous to obviate prior art shortcomings.

SUMMARY OF THE INVENTION

According to one aspect of the invention, a method includes limiting a Raman radiation obtained as a result of an interaction of laser light with a hydrocarbon-containing fuel gas to a wavenumber range of C—H stretching vibrations of hydrocarbons around 2900 cm$^{-1}$; supplying the Raman radiation to a first photomultiplier, integratively detecting the Raman radiation by the first photomultiplier, generating an output signal by the first photomultiplier in response to the integrative detection of the Raman radiation, and determining a gross or net calorific value of the hydrocarbon-containing fuel gas from the output signal of the first photomultiplier.

According to another aspect of the invention, a measuring instrument includes a Raman photometer including a first bandpass filter configured to limit a Raman radiation obtained as a result of an interaction of laser light with a hydrocarbon-containing fuel gas to a wavenumber range of C—H stretching vibrations of hydrocarbons in the fuel gas around 2900 cm$^{-1}$, and a first photomultiplier receiving the limited Raman radiation and generating an output signal commensurate with the limited Raman radiation, and an evaluation device configured to determine a gross or net calorific value of the hydrocarbon-containing fuel gas from the output signal of the first photomultiplier.

In accordance with the invention, a Raman photometer is used to determine the gross or net calorific value by way of a spectroscopic integral method. The invention is based on the observation that the surface integral of the Raman signatures (referred to in the following as the Raman signal) of the hydrocarbons contained in the fuel gas in the narrow range of the Raman shift of 2900 cm$^{-1}$ caused by the C—H stretching vibrations correlates with the gross calorific value and the (in practice, less relevant) net calorific value of the fuel gas.

The hydrocarbons involved in the determination of the gross or net calorific value are in particular methane and ethene, as well as the higher alkanes and their isomers through pentane.

According to another advantageous feature of the invention, the gross or net calorific value of the hydrocarbon-containing fuel gas can be determined at an increased pressure of the fuel gas of 1 bar absolute up to 10 bar absolute. Currently preferred is a determination of the gross or net calorific value of the hydrocarbon-containing fuel gas at a pressure of at least 5 bar absolute so as to obtain a Raman signal of sufficient strength.

According to another advantageous feature of the invention, the gross or net calorific value of the hydrocarbon-containing fuel gas can be determined at a wavelength of the laser light of 405 nm±10 nm or 450 nm±10 nm. The Raman signatures can be selectively detected around 2900 cm$^{-1}$ by a bandpass filter having a central wavelength of 459 nm±13 nm and a full width at half maximum of 5 to 10 nm. The short laser wavelength of 405 nm causes no fluorescence in gases and leads to a good yield of Raman photons. Moreover, suitable lasers are available as diode lasers at reasonable cost and with adequate optical power. The scattering in the case of lasers is often specified with ±5 nm.

Alternatively, the Raman excitation can take place at a laser wavelength of 450 nm±10 nm, with the central wavelength of the bandpass filter then lying at around 518 nm. An advantage of a longer wavelength would be that the bandpass filter selects the bands more sharply.

In order to improve a linear regression of the correlation between the Raman signal and the gross or net calorific value in the case of fuel gases with comparatively high or low methane fraction, the surface integral of the Raman signatures of the hydrocarbons having more than one carbon atom (i.e. all hydrocarbons except methane) around the C—C body vibration with a wide Raman shift around 990 cm$^{-1}$ may also be referred to in addition to the surface integral of the Raman signatures of the C—H stretching vibrations.

By expanding the Raman photometer with an additional measuring channel for determining the concentration of hydrogen on the basis of its Raman shift of approx. 4155 cm$^{-1}$, it is also possible to determine the gross calorific value of hydrogen-containing hydrocarbon mixtures. This facilitates the development of applications in the field of hydrogen admixture to the natural gas or biomethane and biogas injection into natural gas networks.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
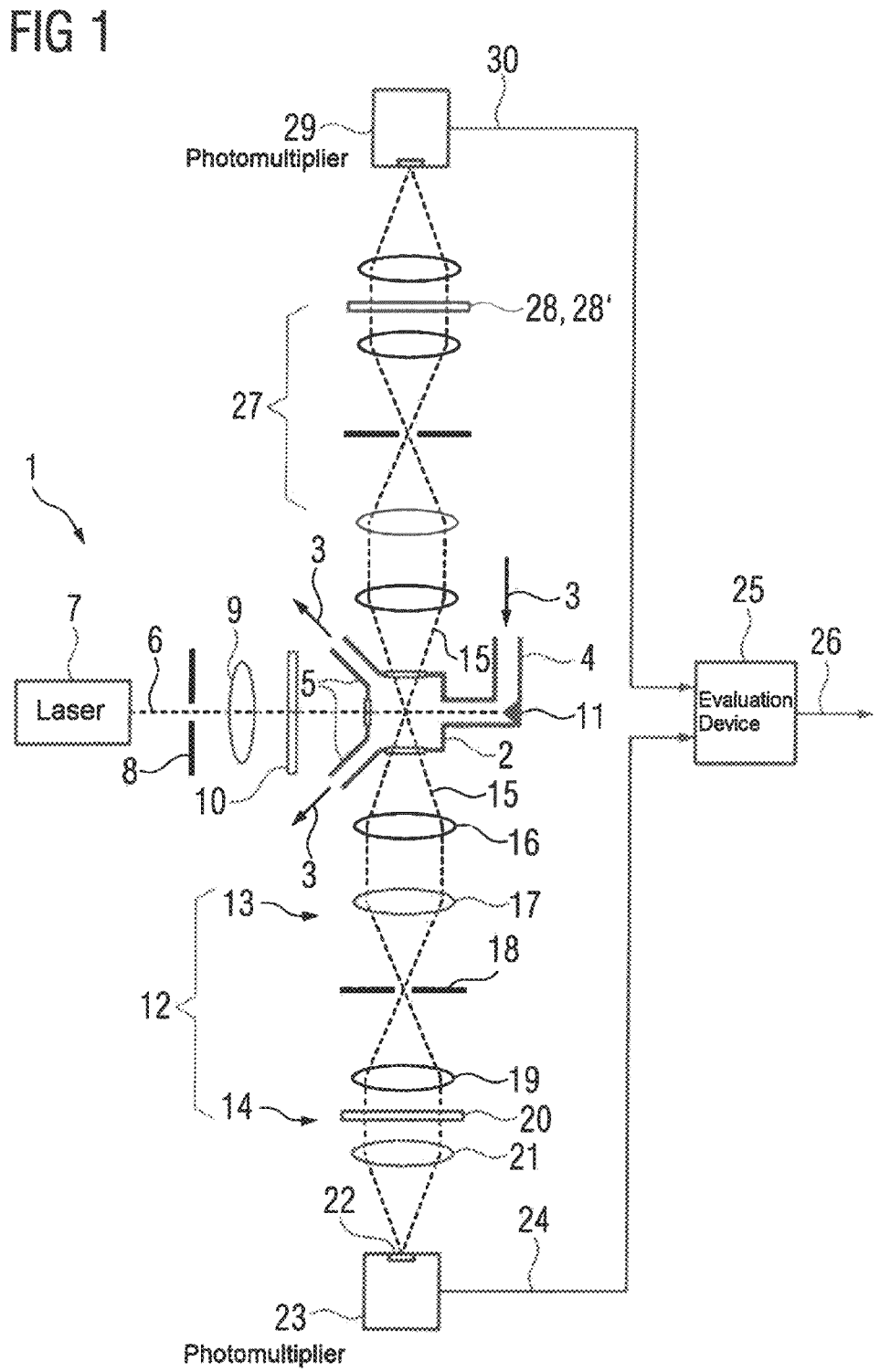
FIG. 1 is a schematic illustration of an example of a measuring instrument according to the invention comprising a Raman photometer.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Figure 2:
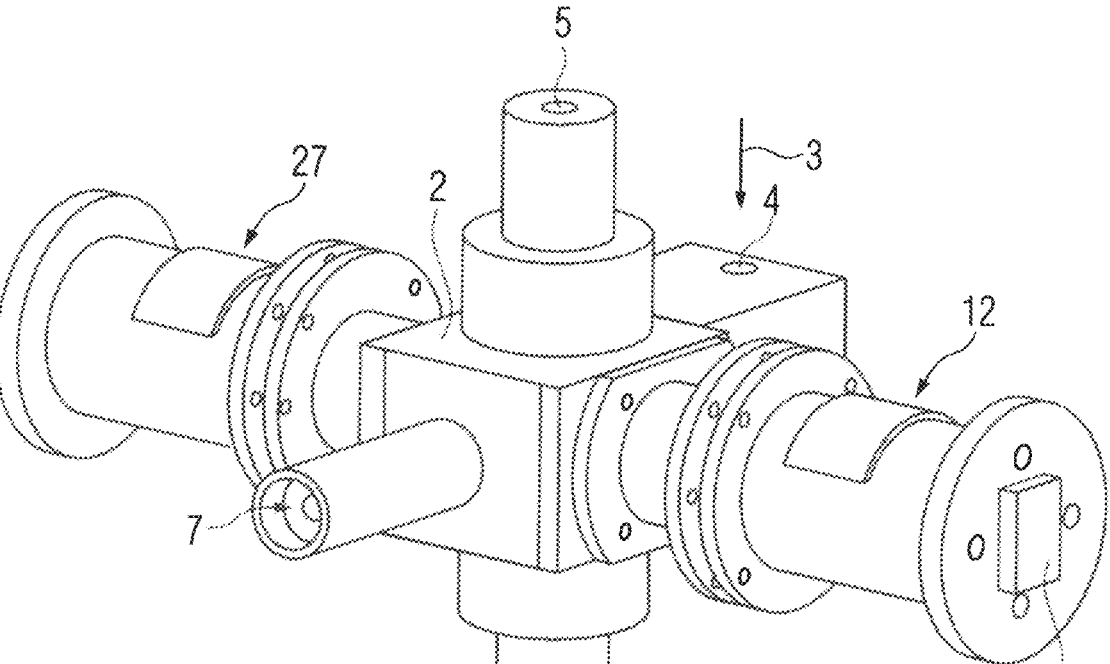
FIG. 2 is a perspective view of the Raman photometer.

Turning now to the drawing, and in particular to FIG. 1, there is shown a schematic illustration of an example of a measuring instrument according to the invention. The measuring instrument 1 includes a Raman photometer 1. FIG. 2 shows the Raman photometer 1 in a perspective view.

The Raman photometer 1 includes a pressure-tight (10 bar) measuring cell 2 through which a fuel gas 3, e.g. natural gas, flows at an increased regulated pressure up to 10 bar absolute. The fuel gas 1 is introduced via a gas inlet 4 into the measuring cell 2 and exits the latter at two gas outlets 5, with the gas outlets 5, contrary to the schematic illustration in FIG. 1, advantageously leading out upward and downward from the drawing plane (cf. FIG. 2). The light beam 6 of a laser 7 falls through a collimator 8, via a focusing lens 9 and an interference filter 10, into the measuring cell 2 and passes through the latter in the direction of the gas inlet 4, where it is intercepted in a backscatter-free light trap 11. The line segment (beam waist) focused by the lens 9 of the light beam (Gaussian beam) 6 is positioned in the center of the measuring cell 2.

Arranged on the measuring cell 2 at a right angle to the laser beam 6 is a first receiving optics assembly 12 for the Raman photons scattered by the molecules of the fuel gas 3.

The receiving optics assembly 12 includes two stages 13, 14, with the scattered light 15 being focused in the first stage 13 with the aid of one or more lenses 16, 17 onto a rectangular collimator 18 of approx. 1×4 mm. This results in a spatial filtering of the scattered light 15 such that only those photons that were scattered out of a limited volume around the focused line segment of the laser beam 6 reach the second stage 14. The first lens 16 can serve as a pressure-tight termination of the measuring cell 2.

In the second stage 14, the scattered light 15 parallelized by a lens 19 passes through a bandpass filter 20 in the form of a narrowband interference filter or, optionally, two interference filters arranged in series. The photons selected by the bandpass filter 20 on a gas-component-specific basis are imaged by a further lens 21 on a rectangular photocathode 22 (approx. 1×4 mm) of a photomultiplier 23, by means of which they are detected individually. The photomultiplier 23 generates an output signal (Raman signal) 24 which is proportional to the number of photons absorbed per unit time by the photocathode 22 and is supplied to an evaluation device (processor) 25 in order to evaluate and determine as well as output the gross calorific value 26 of the fuel gas 3.

Advantageously, a laser 7 having a wavelength of 405 nm is used. This short wavelength causes no fluorescence in gases and leads to a good yield of Raman photons. Furthermore, the corresponding laser 7 is available as a diode laser at affordable cost. In order to comply with the Ex protection requirements, the laser power can be limited to below 35 mW, enabling a limit of detection for methane of <100 ppm to be achieved over a measurement interval of one second. The beam quality and line width of the laser beam 6 are improved by the collimator 8 and the narrowband interference filter 10 such that the background signal in the measuring cell 2 is brought to a low level. The background signal is also greatly reduced by the arrangement and design of the gas outlets 5 and the light trap 11. The photomultiplier 23 serves to convert the only very small number of Raman photons generated, in particular also due to the low laser power, into a sufficiently strong Raman signal 24. Furthermore, the measurements are performed at an increased pressure in the measuring cell 2 of, e.g., 5 bar absolute, because the number of Raman photons generated and consequently the Raman signal 24 increase in proportion to the measurement pressure. For this purpose, a pressure regulator can be provided at the gas outlets 5, which may be joined together.

In order to enable the measuring instrument to be operated at higher laser power (>35 mW) in an industrial environment, the measuring cell 2 can also be implemented encapsulated in a pressure-tight enclosure (Ex-d).

Figure 3:
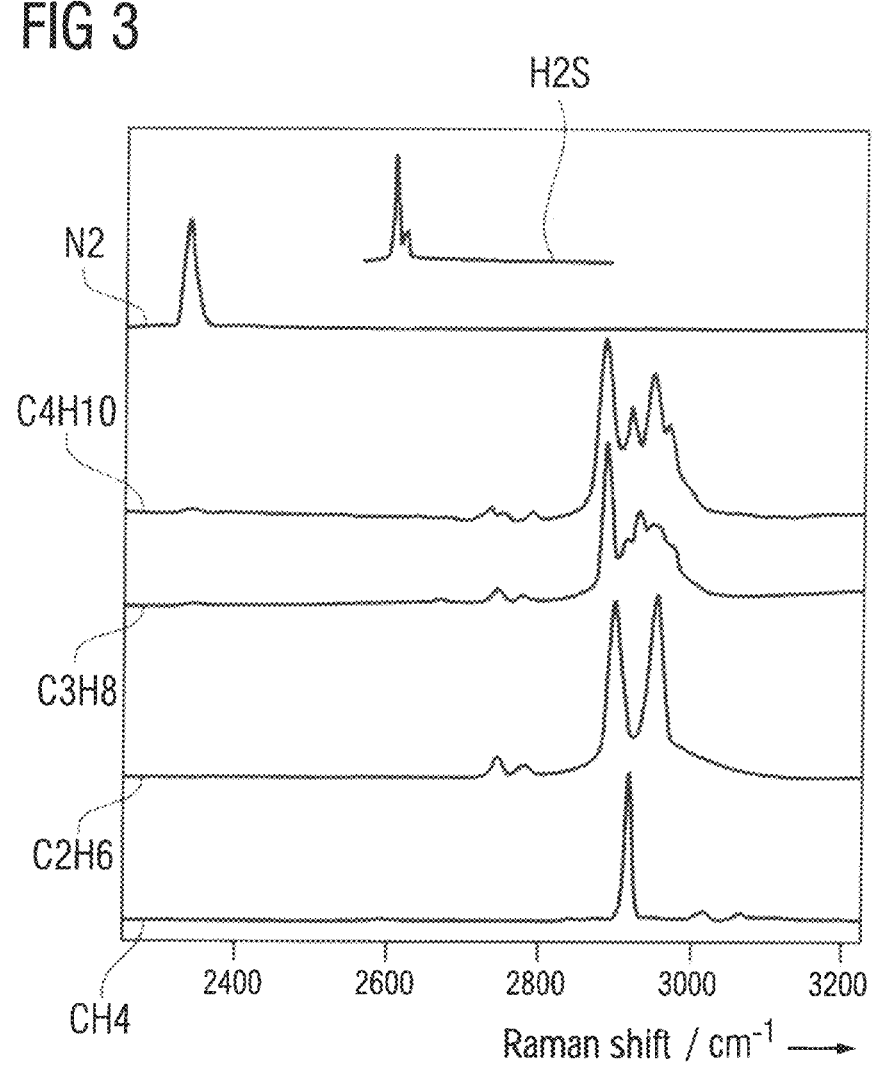
FIG. 3 shows a Raman signature of hydrocarbons around a Raman shift of 2900 cm$^{-1}$.

FIG. 3 shows an extract from the Raman spectra of the major components of natural gas, in this case methane, ethane, propane and butane, and the minor components nitrogen and hydrogen sulfide. Even higher hydrocarbons and various isomers are also contained in low concentration <0.1% in natural gas. As shown, the Raman shifts generated by the C—H stretching vibrations of the hydrocarbons are around 2900 cm$^{-1}$. They are roughly the same for all the hydrocarbons and are free of any other chemical bonds in the natural gas mixture 3. The following equation applies to the relationship between the central wavelength $\lambda$ of the bandpass filter 20, the laser wavelength $\lambda_{ex}$ and the Raman shift RS:

$$1/\lambda[nm] = 1/\lambda_{ex}[nm] - RS[cm^{-1}]/10^{7}.$$

In the case of the exemplary embodiment of the Raman photometer 1 described herein, the bandpass filter 20 is chosen with a central wavelength of approx. 459 nm and a full width at half maximum (FWHM) of 5 to 10 nm such that the cited C—H stretching vibrations are detected.

Thus, the gross calorific value is determined by the Raman photometer 1, not by determining the individual combustible components of the fuel gas, but by way of an integral measurement of the concentration of the "combustible chemical bonds" in the hydrocarbons in question. These are mainly the C—H bonds that are detected in total by the bandpass filter 20 on the basis of their Raman shifts around 2900 cm-1. It was recognized that the Raman signal 24 correlates with the gross calorific value of the natural gas 3. The correlation comes about as a result of the fact that, on account of the increased number of C—H bonds per unit volume, ethane, propane and higher hydrocarbons have a higher Raman scattering cross-section and therefore generate a higher scattered light signal at the surface integral of the Raman signature around the Raman shift of 2900 cm$^{-1}$. For an optimal correlation with the gross calorific value, it is therefore necessary, as already mentioned above, to correctly select the position of the central wavelength and the full width at half maximum of the bandpass filter 20 in order to ensure that the entire signature is detected, in particular in the case of the higher alkanes.

Figure 4:
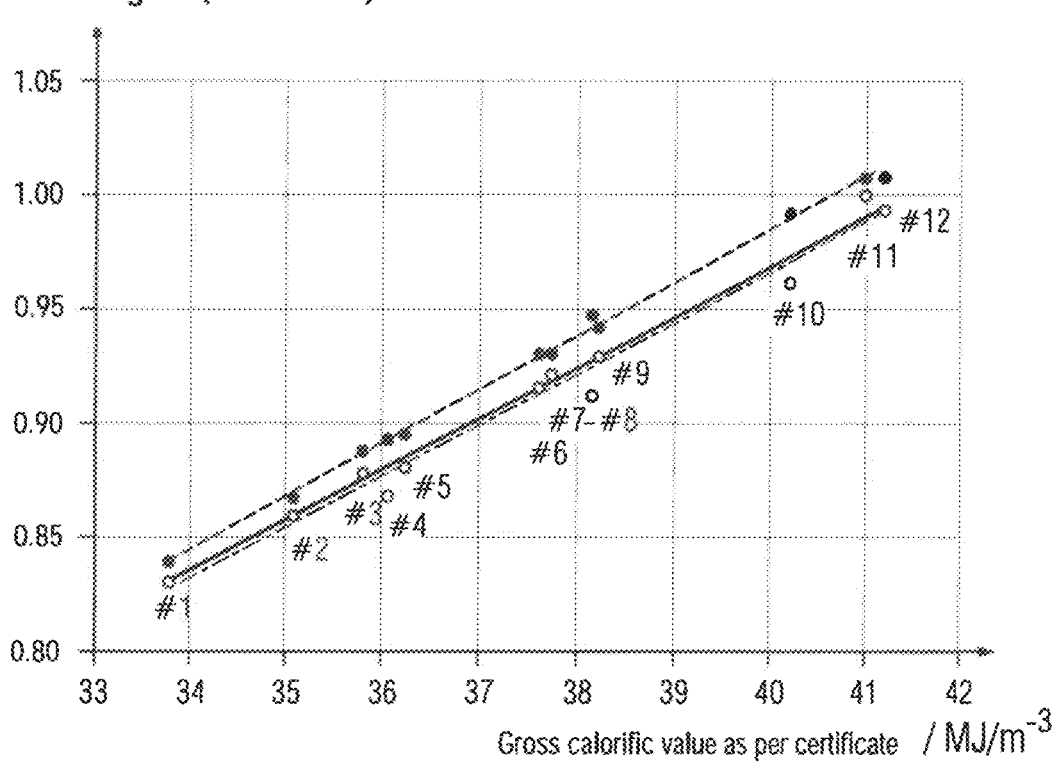
FIG. 4 is a graphical illustration showing an example of the correlation of the Raman signals obtained by the Raman photometer with gross calorific values of different natural gas mixtures.

In FIG. 4, the correlation is illustrated by means of a graph on the basis of Raman signals 24 obtained for twelve natural gas mixtures with known gross calorific values. The measurements #1 to #12 were taken at a pressure of 5000 hPa absolute, a flow rate of the measurement gas 3 through the measurement chamber 2 of 1000 ml/min and a temperature regulated to a constant 25° C. The gross calorific value specifications were determined by the supplier of the natural gas mixtures by means of a GC analysis and detailed on the analysis certificates. The background signal of nitrogen (only approx. 0.01% of the C—H Raman signal) was subtracted from the Raman signals 24. The regression line of the twelve measurement points (white-filled circles) is shown in FIG. 4 as a solid line. Among the twelve measurement points there are four clear outliers, of which the outliers #4, #8, #10 lying below the regression line result from the natural gas mixtures having the lowest methane fractions, and the outlier #11 above the regression line results from the natural gas mixture having the highest methane fraction. It follows from these results that the higher alkanes remain somewhat underestimated in the Raman measurement method. Widening the bandpass filter 20 could produce an improvement in the correlation coefficient. An uncertainty in the determination of the gross calorific value with the aid of the Raman measurement method of 1.5% can be derived from the measurement shown in FIG. 4.

When the outliers #4, #8, #10, #11 are disregarded, the dash-dotted regression line is obtained. According to the greatest deviation, the uncertainty in the determination of the gross calorific value then amounts to only 0.5% of the gross calorific value as per certificate.

Instead of disregarding the outliers #4, #8, #10, #11, their values can also be corrected as a function of the methane concentration in the fuel gas 3. To that end, the methane concentration can be measured separately with the aid of a selective nondispersive infrared (NDIR) gas analyzer, for example.

Alternatively, the measured values #1 to #12 can be corrected by means of a higher weighting of all of the hydrocarbons except methane, the Raman radiation 15 being limited in a second receiving optics assembly 27 by a further bandpass filter (interference filter) 28 to a wavenumber range of the C—C vibrations of the hydrocarbons contained in the fuel gas 3 and having more than one carbon atom around 990 cm$^{-1}$ and being integratively detected in a second photomultiplier 29. The second receiving optics assembly 27 is mounted on the measuring cell 2 opposite the first receiving optics assembly 12 and is identical in construction to the latter except for the bandpass filter 28. The correction can be accomplished in a simple manner by adding the output signal (Raman signal) 30 of the second photomultiplier 29 to the output signal 24 of the photomultiplier 23 using a calibration factor in the evaluation device 25. The corrected measurement points are shown as black-filled circles in FIG. 4 and their regression line as a dashed line.

Should an admixture of hydrogen to natural gas find application in the future (e.g. storing of regenerative energy in the natural gas network), the concentration of the hydrogen in the gas mixture 3 must also be taken into account in addition in the determination of the gross calorific value. The Raman shift of hydrogen at 4155 cm$^{-1}$ is very well suited for this purpose. By simply replacing the bandpass filter 28 in the second receiving optics assembly 27 with another suitable bandpass filter 28' or with the aid of a filter slider or filter wheel containing the bandpass filters required in each case, it is therefore possible also to measure other components such as carbon dioxide, nitrogen and hydrogen sulfide in addition to hydrogen. Thus, by including a nitrogen measurement or a carbon dioxide measurement, it may be possible to achieve more accurate results in the determination of the gross or net calorific value over a greater range of the methane concentration. The required central wavelengths of the corresponding bandpass filters are listed in the following table.

| Gas component | Raman shift [cm$^{-1}$] | Relative Raman scattering cross-section | Central wavelength of the Raman band [nm] upon excitation at 405 nm | Central wavelength of the Raman band [nm] upon excitation at 450 nm |
|---|---|---|---|---|
| H2 (Hydrogen) | 4155 | 3.9 | 487 | 554 |
| N2 (Nitrogen) | 2331 | 1.0 | 447 | 503 |
| CO2 (Carbon dioxide) | 1388 | 1.1 | 429 | 480 |
| CH4 (Methane) | 2917 | 8.6 | 459 | 518 |
| C2H6 (Ethane) | 2914 | 15.0 | 459 | 518 |
| C2H4 (Ethene) | 3020 | 6.4 | 461 | 521 |
| C3H8 (Propane) | 2908 | 19.6 | 459 | 518 |
| C4H10 (n-Butane) | 2890 | 15.6 | 459 | 517 |
| C4H10 (Isobutane) | 2880 | 8.4 | 458 | 517 |
| H2S (Hydrogen sulfide) | 2610 | | 453 | 510 |

To allow concurrent measurement of the different components, the Raman photometer 1 can also be equipped with more than the two receiving optics assemblies 12, 27 shown herein, in which case the further receiving optics assemblies can be mounted on the measuring cell 2 in particular in the direction perpendicular to the drawing plane.

Purely for greater simplicity of illustration, the windows through which the laser beam 6 enters the measuring cell 2 and the Raman radiation 15 exits the measuring cell 2 are not shown in FIG. 1. The windows can be formed by the interference filter 10 and lenses, e.g. lens 16, of the receiving optics assemblies 12, 27.

The Raman measurement method according to the invention can easily be calibrated using a series of calibration gases. The measurement is performed on the continuous gas stream, the result being available at one-second intervals.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method, comprising:

limiting a Raman radiation obtained as a result of an interaction of laser light with a hydrocarbon-containing fuel gas to a wavenumber range of C—H stretching vibrations of hydrocarbons around 2900 cm$^{-1}$;

supplying the limited Raman radiation to a first photomultiplier;

integratively detecting the limited Raman radiation by the first photomultiplier;

generating an output signal by the first photomultiplier in response to the integrative detection of the limited Raman radiation;

determining a gross or net calorific value of the hydrocarbon-containing fuel gas from the output signal of the first photomultiplier;

further limiting the Raman radiation;

supplying the further limited Raman radiation to a second photomultiplier;

integratively detecting the further limited Raman radiation by the second photomultiplier;

generating an output signal by the second photomultiplier in response to the integrative detection of the further limited Raman radiation; and correcting the gross or net calorific value of the hydrocarbon-containing fuel gas determined from the output signal determined by the first photomultiplier with the output signal of the second photomultiplier.

2. The method of claim 1, wherein the hydrocarbons comprise C1 to C5 alkanes and their isomers.

3. The method of claim 1, wherein the gross or net calorific value of the hydrocarbon-containing fuel gas is determined at an increased pressure of the fuel gas of 1 bar absolute up to 10 bar absolute.

4. The method of claim 1, wherein the gross or net calorific value of the hydrocarbon-containing fuel gas is determined at a pressure of at least 5 bar.

5. The method of claim 1, wherein the gross or net calorific value of the hydrocarbon-containing fuel gas is determined at a wavelength of the laser light of 405 nm±10 nm or 450 nm±10 nm.

6. The method of claim 1, wherein the Raman radiation is limited by a bandpass filter having a central wavelength of 459 nm±13 nm or 518 nm±13 nm and a full width at half maximum of 5 to 10 nm.

7. The method of claim 1, wherein the further limited Raman radiation is in a wavenumber range of the C—C vibrations of the hydrocarbons contained in the fuel gas and having two or more carbon atoms around 990 cm$^{-1}$.

8. The method of claim 7, wherein the Raman radiation is further limited by a bandpass filter.

9. The method of claim 1, wherein the hydrocarbon-containing fuel gas contains hydrogen, and the further limited Raman radiation is in a wavenumber range around 4155 cm$^{-1}$.

10. The method of claim 9, wherein the Raman radiation is further limited by a bandpass filter.

11. A measuring instrument, comprising:

a Raman photometer including a first bandpass filter configured to limit a Raman radiation obtained as a result of an interaction of laser light with a hydrocarbon-containing fuel gas to a wavenumber range of C—H stretching vibrations of hydrocarbons in the fuel gas around 2900 cm$^{-1}$, and a first photomultiplier receiving the limited Raman radiation and generating an output signal commensurate with the limited Raman radiation;

a second bandpass filter to further limit the Raman radiation;

a second photomultiplier receiving the further limited Raman radiation and generating an output signal commensurate with the further limited Raman radiation; and an evaluation device configured to determine a gross or net calorific value of the hydrocarbon-containing fuel gas from the output signal of the first photomultiplier and to correct the gross or net calorific value of the hydrocarbon-containing fuel gas determined from the output signal of the first photomultiplier with the output signal of the second photomultiplier.

12. The measuring instrument of claim 11, configured to execute a method as set forth in claim 1.

13. The measuring instrument of claim 11, wherein the Raman photometer includes a measuring cell in which the fuel gas is held at an increased pressure of the fuel gas of 1 bar absolute up to 10 bar absolute.

14. The measuring instrument of claim 13, wherein the fuel gas is in the measuring cell has a pressure of at least 5 bar.

15. The measuring instrument of claim 11, wherein the first bandpass filter has a central wavelength of 459 nm±13 nm or 518 nm±13 nm and a full width at half maximum of 5 to 10 nm.

16. The measuring instrument of claim 11, wherein the further limited Raman radiation is in a wavenumber range of the C—C vibrations of the hydrocarbons contained in the fuel gas and having two or more carbon atoms around 990 cm$^{-1}$.

17. The measuring instrument of claim 11, wherein the further limited Raman radiation is in a wavenumber range around 4155 cm$^{-1}$, when the hydrocarbon-containing fuel gas contains hydrogen.

* * * * *